United States Patent [19]

Mussini

[11] Patent Number: 5,246,977
[45] Date of Patent: Sep. 21, 1993

[54] MICROCELLULAR POLYURETHANE POLYMERS PREPARED FROM ISOCYANATE-TERMINATED POLY(OXYTETRAMETHYLENE) GLYCOL PREPOLYMERS

[75] Inventor: Stefano Mussini, Sassuolo, Italy

[73] Assignee: The Dow Chemical Company, Midland, Mich.

[21] Appl. No.: 921,200

[22] Filed: Jul. 28, 1992

Related U.S. Application Data

[63] Continuation of Ser. No. 688,029, Apr. 19, 1991, abandoned.

[30] Foreign Application Priority Data

May 4, 1990 [IT] Italy .............................. 20205 A/90

[51] Int. Cl.$^5$ .............................................. C08G 18/10
[52] U.S. Cl. ...................................... 521/159; 528/59; 528/60
[58] Field of Search ................... 521/159; 252/182.22; 528/59, 60

[56] References Cited

U.S. PATENT DOCUMENTS

| | | | |
|---|---|---|---|
| 4,374,210 | 2/1983 | Ewen et al. | 521/159 |
| 4,739,027 | 4/1988 | Mendelsohn et al. | 528/60 |
| 4,771,083 | 9/1988 | Altournian | 521/159 |
| 5,091,437 | 2/1992 | Lunardon et al. | 521/159 |

FOREIGN PATENT DOCUMENTS

| | | | |
|---|---|---|---|
| 0449331 | 10/1991 | European Pat. Off. | 521/159 |
| 3729822 | 3/1989 | Fed. Rep. of Germany . | |
| 9117197 | 11/1991 | World Int. Prop. O. | 521/159 |

*Primary Examiner*—John Kight, III
*Assistant Examiner*—Rachel Johnson

[57] ABSTRACT

This invention relates to a process for preparing microcellular polyurethane polymers by reaction of an organic polyisocyanate composition comprising a 4,4'-methylene diphenylisocyanate, isocyanate-terminated poly(oxytetramethylene) glycol prepolymer with an active hydrogen-containing composition which comprises a polyether polyol and a chain-extending agent, in the presence of a blowing agent comprising water. Resulting polymers display good physical properties including abrasion resistance and durability and are of value in shoe soles applications and automotive applications.

17 Claims, No Drawings

MICROCELLULAR POLYURETHANE POLYMERS PREPARED FROM ISOCYANATE-TERMINATED POLY(OXYTETRAMETHYLENE) GLYCOL PREPOLYMERS

CROSS-REFERENCE TO RELATED APPLICATION

This is a continuation of application Ser. No. 07/688,029 filed Apr. 19, 1991, now abandoned.

BACKGROUND OF THE INVENTION

This invention relates to a microcellular polyurethane polymer and a process for its preparation using an isocyanate-terminated poly(oxytetramethylene) glycol prepolymer.

Microcellular polyurethane polymer for applications such as, for example, shoe soles typically may be obtained by reaction of an isocyanate compound with an active hydrogen-containing compound such as, for example, a polyester polyol. For processing convenience advantageously, the isocyanate compound is an isocyanate-terminated prepolymer prepared by reaction of an excess of an aromatic diisocyanate with a low molecular weight diol such as, for example, dipropylene glycol and/or tripropylene glycol. Subsequently, such prepolymer is reacted with an active hydrogen-containing composition, frequently comprising a polyester or polyether polyol, in the presence of a physical blowing agent such as, for example, trichlorofluoromethane to provide the polyurethane. The preparation of polyurethane polymer by such procedures is described in, for example, patent publications E.P. 235,888; E.P. 175,733; U.S. Pat. Nos. 3,591,532; 3,901.959; 4,647,596 and 4,757,095.

Isocyanate-terminated prepolymers obtained, in the manner as described above, from low molecular weight polyols or diols are frequently identified as a "hard-segment" prepolymers in contrast to "soft-segment" prepolymers generally obtained from high molecular weight polyols or diols. The terminology, "hard-" and "soft-segment", derives from the morphology of elastomeric polymers which can contain distinct phase separated regions. Such regions can be detected by thermoanalysis techniques and distinguished by, for example, glass transition temperatures. Generally, soft-segments of the polymer can be considered as having glass transition temperatures below room temperature whilst hard-segments can be considered as having glass transition temperatures above room temperature or even melting points if a crystallite. It is the current opinion and hence their classification that "soft-segment" prepolymers are associated with the formation of the soft-segment phase of the elastomer and conversely hard-segment prepolymers with the hard-segment phase of the elastomer. Structure-property relationships of hard- and soft-segment phases are described for example by Redman in "Developments in Polyurethanes—I" J. M. Buist Ed., Elsevier, London—published 1978. The distinction of the prepolymer type on molecular weight of the polyol used in the preparation of the prepolymer is arbitrary but general such prepolymers obtained from diols or triols having an equivalent weight of about 150 or less are considered to be "hard- segment" prepolymers.

Although providing microcellular polyurethane polymers with commercially attractive physical properties such above-mentioned processes have a number of disadvantages. Firstly, suitable polyester polyols are costly and frequently highly viscous or even low-melting point solids thus requiring handling and processing at elevated temperatures. Secondly, the use of hard-segment prepolymer restricts and makes it difficult to substitute or eventually replace all of the physical blowing agent, with for example water, without affecting significantly the physical properties of the resulting polymer, especially its flexibility and abrasion resistance properties. Polyester polyol-based polyurethane polymers frequently exhibit poor low temperature flexibility, especially at temperatures below about $-25°$ C., thus limiting there use in some applications.

As an alternative to polyester polyols, cheaper polyether polyols which generally have lower viscosities and thus can be handled and processed at ambient temperature, may be used in the preparation of the microcellular polyurethane polymers. However, the physical properties of the resulting polymer may and often are inferior compared to polyester-based polymers in for example wear resistance.

Due to current environmental concern relating to the earths atmosphere it is highly desirable to substitute certain physical blowing agents with alternative blowing agents. A highly suitable alternative blowing agent is water. It is therefore desirable to develop a new process for the preparation of polyurethane polymers, particularly microcellular polyurethane polymers, based on polyether polyols allowing for convenient processing and use of a blowing agent comprising water. Particularly it is desired to provide such a process that leads to the manufacture of polyurethane polymers having desirable physical properties at low temperatures, e.g. below $0°$ C. To this purpose we have investigated the use of "soft-segment" prepolymers in the preparation of polyether polyol-based polyurethane polymers and more particularly the use of "soft-segment" prepolymers obtained by reaction of methylene diphenylisocyanate with a poly(oxytetramethylene)glycol. Such types of prepolymer and their use in the preparation of resilient polyurethane elastomers have been documented in the literature see, for example, U.S. Pat. No. 4,739,027 which discloses the reaction of prepolymer with a chain extending composition containing low molecular weight triol and diol components.

SUMMARY OF THE INVENTION

It is now been discovered that polyurethane polymers having commercially attractive physical properties including abrasion resistance and durability may be prepared by a process which comprises contacting under reaction conditions a polyisocyanate composition comprising an isocyanate-terminated poly(oxytetramethylene) glycol prepolymer with an active hydrogen-containing composition.

In a first aspect, this invention is a process for preparing a polyurethane polymer by intimately contacting under reaction conditions an organic polyisocyanate composition with an active hydrogen-containing composition in the presence of a blowing agent comprising water characterized in that a) the polyisocyanate composition comprises, in from at least about 70 weight percent, an isocyanate-terminated prepolymer which has an isocyanate content of from about 14 to about 28 weight percent and which is obtained by reacting a polyisocyanate containing, in from at least 70 weight percent, 4,4'-methylene diphenylisocyanate with a poly(oxytetramethylene) glycol which has an average hydroxyl equivalent weight of from about 250 to about 1500;

b) the active hydrogen-containing composition comprises:

i) from about 70 to about 99 parts by weight of a polyether polyol or mixtures thereof which has an average hydroxyl equivalent weight of from about 500 to about 5000, an average molar functionality of from about 1.6 to about 3.0 and a primary hydroxyl content of at least 50 percent of its total hydroxyl content; and ii) in from about 1 to about 30 parts by weight of a chain-extending agent which has an equivalent weight of less than or equal to about 150; and c) the blowing agent is present in an amount sufficient to provide the resulting polymer with an overall density of from about 100 to about 1000 kg/m$^3$, and wherein the polyisocyanate composition (a) is present in an amount so as to provide from about 0.85 to about 1.3 isocyanate groups per active hydrogen atom of the composition (b) and water present.

In a second aspect, this invention is a microcellular polyurethane polymer prepared by the process as described in the first aspect In a third aspect, this invention is an isocyanate-terminated poly(oxytetramethylene)glycol prepolymer that has an isocyanate content of from about 14 to about 28 weight percent obtained by intimately mixing under reaction conditions a poly(oxytetramethylene)glycol which has an average hydroxyl equivalent weight of from about 250 to about 1500 with a molar excess of an organic polyisocyanate containing a) in from at least 70 weight percent, 4,4'-methylene diphenylisocyanate, and b) up to 30 weight percent of one or more polyisocyanates selected from the group consisting of 2,4'-methylene diphenylisocyanate, 2,4- and 2,6-toluene diisocyanate, cyclohexane diisocyanate, 1,6-hexamethylene diisocyanate, carbodiimide-modified adducts thereof and polymethylenepolyphenylpolyisocyanate.

Surprisingly it has been found that by using such "soft-segment" prepolymers as described above in place of the normally employed "hard-segment" isocyanate-prepolymers prepared from low molecular weight diols, then an active hydrogen-containing composition comprising a polyether polyol can be employed to advantage for the preparation of microcellular polyurethane polymers providing good processability and resulting polymeric products. By low molecular weight diols it is understood compounds having an equivalent weight of about 150 or less.

DETAILED DESCRIPTION OF THE INVENTION

Polyurethane polymers are prepared according to the process of this invention by intimately contacting under reaction conditions an organic polyisocyanate composition with an active hydrogen-containing composition in the presence of a blowing agent comprising water. The polyisocyanate composition is present in an amount to provide from about 0.85 to about 1.30 isocyanate groups per active hydrogen atom of the active hydrogen-containing composition and water present. Preferably, the polyisocyanate composition is present in an amount to provide from about 0.94, more preferably from about 0.95 and most preferably from about 0.96 and up to about 1.05, more preferably up to about 1.04 and most preferably up to about 1.02 isocyanate groups per active hydrogen atom of the active hydrogen-containing composition and water present.

The polyisocyanate composition is characterized in that it comprises, in from at least about 70, preferably from at least about 80 and more preferably from at least about 90, and up to 100 weight percent of the total weight of the isocyanate composition, a poly(oxytetramethylene) glycol-based isocyanate-terminated prepolymer. When the polyisocyanate composition does not comprise in its entirety the isocyanate-terminated prepolymer, other polyisocyanates that can be present include aliphatic or preferably aromatic polyisocyanates as described in, for example U.S. Pat. Nos. 4,065,410; 3,401,180; 3,454,606; 3,152,162; 3,492,330; 3,001,973; 3,394,164 and 3,124,605. Particularly suitable aromatic polyisocyanates include 2,4- and/or 2,6-toluene diisocyanate (TDI), 2,4'- and/or 4,4'-methylene diphenylisocyanate (MDI), p-phenylene diisocyanate and polymethylenepolyphenyl-polyisocyanates and mixtures thereof. Also useful are polymeric derivatives of MDI, as well as carbodiimide-containing derivatives of MDI. Particularly suitable aliphatic polyisocyanates include the hydrogenated derivatives of the foregoing aromatic polyisocyanates, as well as hexamethylene diisocyanate, isophorone diisocyanate and 1,4-cyclohexanediisocyanate.

The poly(oxytetramethylene) glycol-based isocyanate-terminated prepolymer present in the polyisocyanate composition is characterized in that it has an average isocyanate content of from about 14 to about 28, preferably from about 14 to about 23, and more preferably from about 15 to about 21 weight percent. The use of prepolymers having an isocyanate content outside this range may not provide for desirable processability or physical properties of the resulting polymer.

The prepolymer is obtained by mixing under reaction conditions a molar excess of an organic polyisocyanate containing, in from at least about 70, preferably from at least about 85, and more preferably from at least about 93 weight percent, 4,4'-methylene diphenylisocyanate with a poly(oxytetramethylene) glycol which has an average hydroxyl equivalent weight of from about 250, preferably from about 500, and more preferably from about 750 and up to about 1500, preferably up to about 1200 and more preferably up to about 1000. The polyisocyanate used to prepare the prepolymer may contain other isocyanates including, for example, 2,4'-methylene diphenylisocyanate, 2,4- and 2,6-toluene diisocyanate, cyclohexane diisocyanate, 1,6 hexamethylene diisocyanate and carbodiimide-modified adducts thereof and polymethylenepolyphenylpolyisocyanates. When such other isocyanates are present advantageously it is in an amount not exceeding about 30, preferably not exceeding about 15 and more preferably not exceeding about 7 weight percent by total weight of organic polyisocyanate to be reacted with the poly(oxytetramethylene) glycol. Most preferably such other isocyanates are absent or present in only trace amounts. By "trace" amount, it is understood up to about 2 weight percent.

When preparing the prepolymer, the quantity of poly(oxytetramethylene) glycol employed for a given quantity of polyisocyanate is dependent up on the glycols' equivalent weight and the desired isocyanate content of the resulting prepolymer. By way of illustration, suitable prepolymers are those prepared where the organic polyisocyanate consisting essentially of 4,4'-methylene diphenylisocyanate is present in from about 40, preferably from about 50. and up to about 90, preferably up to about 80 and more preferably up to about 70 parts by weight; and wherein the poly(oxytetramethylene) glycol is present in from about 10, preferably from about 20 and more preferably from about 30 and up to about 60 and preferably up to about 50 parts by weight. When lower equivalent weight poly(oxytetramethylene) glycols are used to prepare the prepolymers, they are employed in smaller quantities relative to higher molecular weight poly(oxytetramethylene) glycols for a given weight of isocyanate.

The active hydrogen-containing composition used in the process of this invention is characterized in that it comprises as first component a polyether polyol or mixtures thereof and as a second component a chain-extending agent. The polyether polyol component of the active hydrogen-containing composition is advantageously present in an amount of from about 70, preferably from about 75, and more preferably from about 80, and up to about 99, preferably up to about 95, and more preferably up to about 90 parts by weight of total weight of the active composition. As second component, the chain-extending agent advantageously is present in quantities of from about 1, preferably from about 5, and more preferably from about 6 and up to about 30, preferably up to about 15 and more preferably up to about 13 parts by weight of total weight of the active hydrogen-containing composition. The optimum amount of chain-extending agent present depends on its equivalent weight and the physical properties desired for the resulting polymer. Greater molar quantities of chain-extending agent generally provide for polymers which are harder and somewhat less flexible. Generally the polyurethane polymers produced by the process of this invention are characterized by having a Shore A Hardness of from at least 30A, preferably from about 40A to about 75A, more preferably from about 45A to about 70A, and most preferably from about 50A to about 70A.

The polyether polyol component of the active hydrogen-containing composition is characterized in that it has an average functionality of from about 1.6, preferably from about 1.8 and more preferably from about 1.9, and up to about 3.0; an average hydroxyl equivalent weight of from about 500 to about 5000, preferably from about 1000 to about 3000, and more preferably from about 1500 to about 2500; and a primary hydroxyl content of at least 50 and preferably at least 75 percent of its total hydroxyl content. By "average functionality" it is understood the average number of isocyanate-reactive hydrogen atoms per molecule.

Suitable polyether polyols for use as the component of the active hydrogen-containing composition in the process of this invention include those obtained by reaction of a suitable active hydrogen-containing initiator with a quantity of one or more $C_{2-4}$ alkylene oxides including 1,4-butylene oxide, 2,3-butylene oxide, and especially propylene oxide and ethylene oxide, to give a product of desired hydroxyl nature and equivalent weight. Suitable processes for the preparation of the polyether polyols are such as, for example, disclosed by Wurtz in 1859 (see Encyclopedia of Chemical Technology, Vol. 7, pp. 257-262, published by Interscience Publishers, Inc. (1951) or U.S. Pat. Nos. 1,922,459 and 3,040,076. Generally, the alkylene oxide(s) is polymerized at pressures above atmospheric pressure with an initiator in the presence of a strongly basic material such as an alkali metal hydroxide or tertiary amine acting as an alkoxylation catalyst. Suitable catalysts include potassium hydroxide and sodium hydroxide. For the purpose of this invention, active hydrogen atoms are defined as those hydrogens which react positively in the Zerewitinoff test, see Kohler, J.Amer.Chem.Soc., Vol. 49, p. 3181 (1927). Representative of groups containing such active hydrogen atoms are —OH, —COOH, —SH and —NHR where R can be hydrogen, alkyl, cycloalkyl, aryl aromatic and so forth.

Exemplary of suitable initiators bearing such active hydrogen atoms are polyols, polyether adducts of polyols, polyamines and other compounds having a plurality of active hydrogen atoms per molecule, such as are described in column 2 of U.S. Pat. No. 4,500,422 and incorporated herein by reference. Preferred initiators for use in preparing such polyether polyols employed within the polyol blend used in this invention are ethylene glycol, propylene glycol, butylene glycol, glycerine, 1,1,1-trimethylolpropane, 1,1,1-trimethylolethane, α-methylglucoside, $C_{2-8}$ alkylene diamines such as, for example, ethylenediamine and hexamethylenediamine, and mixtures thereof. Especially preferred are the glycol initiators or alkoxylated adducts of such glycols. Exemplary of commercially available and preferred polyether polyols for use in the process of this invention are those polyether polyol products identified by the trademark "Voranol" and include Voranol EP 1900 and Voranol CP 6055, sold by The Dow Chemical Company.

In addition to the polyether polyol component described hereinabove other suitable polyols include so-called polymer polyols based on polyether polyols such as described in columns 3-5 of U.S. Pat. No. 4,394,491, incorporated herein by reference. Among the useful polymer polyols are included dispersions of polymers, of especially vinyl monomers particularly styrene/acrylonitrile copolymers, in a continuous polyether polyol phase. Also useful are the so-called polyisocyanate polyaddition (PIPA) polyols (dispersions of polyurea-polyurethane particles in a polyol) and the polyurea dispersions in polyol such as for example PHD polyols. Copolymer polyols of the vinyl type are described, for example, in U.S. Pat. Nos. 4,390,645; 4,463,107; 4,148,840 and 4,574,137 all incorporated herein by reference. Other additional suitable polyols that may be present include poly(oxytetramethylene) glycols, though they are less preferred due to their frequently higher viscosities.

As second component of the active hydrogen-containing composition, the chain-extending agent is characterized in that it is an organic compound, generally a polyfunctional and especially a difunctional isocyanate-reactive compound that has an equivalent weight of less than or equal to about 150 and preferably less than or equal to about 100. Suitable chain-extending agents include polyhydric alcohols, aliphatic diamines, aromatic diamines and mixtures thereof. Preferred chain-extending agents for use in the process of this invention are dihydroxyl compounds, especially glycols. Representative of suitable chain-extending agents include dihydroxyl compounds comprising aliphatic, cycloaliphatic or aromatic dihydroxyl compounds having from about 2 to about 10 carbon atoms. Exemplary of such dihydroxyl compounds are diols including 1,2-ethanediol, 1,3-propanediol, 1,5-pentanediol, 1,6-hexanediol, 1,2-propanediol, 1,3-butanediol, 1,4-butanediol, 2,3-butanediol, 1,3-pentanediol, 1,6-hexanediol, 3-methylpentane-1,5-diol, 1,4-cyclohexanediol, 1,4-cyclohexanedimethanol and the like including mixtures of two or more such diols. Compounds such as ethoxylated hydroquinone can also be employed as a chain-extending agent. The above-mentioned chain-extending agents can be used alone or admixture or with other compounds including diethylene glycol, dipropylene glycol, ethanolamine, and N-methyldiethanolamine, and N-ethyldiethanolamine and the like, as well as adducts obtained by esterification of, aliphatic carboxylic acids with aliphatic diols or triols such as those exemplified above utilizing from about 0.01 to about 1.08 mole of acid per mole of diol/triol. Also included as chain-extending agents which can be used in the process of this invention are adducts obtained from an aliphatic diol or triol such as 1,4-cyclohexane dimethanol, neopentyl glycol, hexane-1,2-diol, ethylene glycol, butane-1,4-diol, trimethylol propane and the like with caprolactone in a mole ratio of from about 0.01 to about 2 moles of caprolactone per mole of diol or triol. While any of the chain-extending agents exemplified above can be employed in the process of the invention it is preferred to used 1,4-butanediol, 1,6-hexanediol, neopentyl glycol, 1,4-cyclohexane diol, ethylene glycol, bishydroxyethoxybenzene, ethoxylated hydroquinone glycerine, and diethylene glycol either alone or in admixture. Especially preferred as chain-extending agent is 1,4-butanediol.

As mentioned hereinabove the microcellular polyurethane polymer is prepared in the presence of a blowing agent comprising water. The blowing agent is employed in a amount to provide a polymer having an overall density of typically from about 100, preferably from about 300 and more preferably from about 400 and up to about 1000, preferably up to about 900 kg/M$^3$. The amount of water which may be present depends on the desired density of the polymer but it is advantageously from about 0.05 to about 2, preferably from about 0.1 to about 1.5 and more preferably from about 0.1 to about 1.0 weight percent based on the total weight of the active hydrogen-containing composition. Water reacts with isocyanate groups leading to the generation of carbon dioxide which then causes the polymer-forming reaction mass to expand.

If necessary, the blowing agent in addition to comprising water may also contain other suitable physical blowing agents which are low boiling point liquids, generally organic compounds that can vaporize under the influence of the reaction exotherm. Such blowing agents generally have a boiling point below about 100° C. and include halogenated hydrocarbons such as for example methylene chloride, trichlorofluoromethane, dichlorodifluoromethane, dichlorofluoromethane, dichlorotetrafluoroethane, 1,1,2-trichloro-1,2,2-trifluoroethane, 1,1,1-trichloroethane, trichlorodifluoroethane and trichlorofluoroethane. Mixtures of these low boiling liquids with each other and or with hydrocarbons such as, for example, pentane may be used. Typically when present such physical blowing agents are used in an amount of from about 0.1 to about 16, preferably from about 1 to about 10 and more preferably from about 2 to about 6 weight percent by total weight of the active hydrogen-containing composition. When present, it is preferred that such physical blowing agent is a compound considered environmentally acceptable such as, for example, a hydrogen-containing chlorofluorocarbon like trichlorodifluoroethane and/or trichlorofluoroethane.

In the process of this invention optionally but advantageously there is present additional additives such as catalysts, surfactants, fillers, pigments, antioxidants, and antistatic agents. The use of such additives is well-known in the art and reference is made thereto for this purpose.

Suitable catalysts include the tertiary amine and organometallic compounds such as described in U.S. Pat. No. 4,495,081, incorporated herein by reference. When making the polymers by the process of this present invention it is preferred to use catalyst, which when an amine catalyst advantageously is present in from about 0.1 to about 3, preferably from about 0.1 to about 1 and more preferably from about 0.4 to about 0.8 weight percent by total weight of active hydrogen-containing composition. When the catalyst is an organometallic catalyst, advantageously it is present in from about 0.001 to about 0.2, preferably from about 0.002 to about 0.1 and more preferably from about 0.01 to about 0.05 weight percent by total weight of the active hydrogen-containing composition. Particularly useful catalysts are in the case of amine catalysts; triethylenediamine, bis(N,N-dimethylaminoethyl)ether and di(N,N-dimethylaminoethyl)amine and in the case of the organometallic catalysts; stannous octoate, dibutyltin dilaurate, and dibutyltin diacetate. Combinations of amine and organometallic catalysts may also be employed.

Suitable surfactants include the diverse silicone surfactants, preferably those which are block copolymers of a polysiloxane and a polyoxyalkylene. Exemplary of such surfactants are the products DC-193 and Q4-3667 available from Dow Corning and Tegostab B4113 available from Goldschmidt. When present, the amount of surfactant(s) advantageously employed is from about 0.1 to about 2, and preferably from about 0.2 to about 1.3 weight percent by total weight of the active hydrogen-containing composition. Other suitable surfactants also include non-silicone containing surfactants, such as poly(alkyleneoxides).

Suitable pigments and fillers include for example calcium carbonate, graphite, carbon black, titanium dioxide, iron oxide, alumina trihydrate, wollastonite, prepared glass fibers dropped or continuous, polyesters and other polymeric fibers and the like.

In the process of this invention the so prepared polymers may be manufactured by a one shot method according to the known reaction injection molding techniques such as described in, for example, Polyurethanes Handbook by Günter Oertel Hanser Publishes Munich ISBN 0-02-948920-2 (1985). Other suitable methods for preparing microcellular and elastomeric polyurethane polymers are described in, for example, U.S. Pat. Nos 4,297,444; 4,218,543; 4,444,910; 4,530,941 and 4.269,945.

The microcellular polymers prepared according to the the process of this invention are preferably cast polymers. Such a polymer is advantageously prepared by mixing the reaction components at room temperature or slightly elevated temperature and then pouring into an open mold, or injecting the reacting mixture into closed mold, which in either case is heated. The reaction mixture on reacting out takes the shape of the mold to produce a polyurethane polymer of a predefined structure, which can then when sufficiently cured be removed from the mold. Suitable conditions for curing, when a cast polymer is formed, include a mold temperature of typically from about 20° C. to about 150° C., preferably from about 35° C. to about 75° C., and more preferably from about 45° C. to about 55° C., which typically results in a cure time of from about 1 to about 30 minutes and more typically from about 1 to about 10 minutes. Optimum cure conditions will depend on the particular components including catalysts and quantities used in preparing the polymer and also the size and shape of the article manufactured.

The microcellular polymer produced according to the the process of this invention is useful in the preparation of articles such as rollers, door seals, coatings, tires, wiper blades, gaskets, belts, and shoe soles, and is especially useful in these applications where exposure to reduced temperatures, especially below about $-25°$ C., may frequently take place. The microcellular polymer is additionally useful in the preparation of upholstery materials, packing materials and insulation for sound or heat and automotive applications such as, for example, head rests and steering wheels.

The given amount of polyisocyanate is contacted under reaction conditions with the given quantity of glycol and the resulting mixture stirred for about 3 hours at a temperature of from about $70°$ C. to about $75°$ C. before cooling to room temperature. The resulting isocyanate-terminated prepolymer is stabilized by addition of a trace amount, about 100 ppm, of benzoyl chloride. The isocyanate content of the so obtained prepolymers and their viscosities are also given in Table I.

TABLE I

| Reactants (parts by weight) | Pre-polymer 1 | Pre-polymer 2 | Pre-polymer 3 | Pre-polymer 4 | Pre-polymer 5 | Pre-polymer 6 | Pre-polymer 7 | Pre-polymer 8 | Pre-polymer 9 | Pre-polymer 10 |
|---|---|---|---|---|---|---|---|---|---|---|
| PTMG eq. wt. 1000 | 1034 | 886 | 716 | 546 | 750 | 560 | 368 | / | / | / |
| PTMG eq.wt. 500 | / | / | / | / | / | / | / | 797 | 706 | 611 |
| 4,4'-MDI | 966 | 1115 | 1284 | 1454 | 1175 [2] | 1354 [2] | 1534 [2] | 1203 | 1294 | 1389 |
| M143 [1] | / | / | / | / | 75 | 86 | 98 | / | / | / |
| NCO wt. percent | 14.0 | 16.8 | 20.0 | 23.2 | 16.8 | 20.0 | 23.0 | 16.8 | 18.7 | 20.7 |
| Viscosity cSt ($25°$ C.) | 3060 | 1500 | 820 | 300 | 2370 | 1100 | 400 | 1230 | 750 | 410 |

[1] A carbodiimide modified 4,4'-methylene diphenylisocyanate having an isocyanate content of about 28 weight percent, designated as ISONATE 143 and sold by The Dow Chemical Company.
[2] The 4,4'-MDI represents 94 percent by weight of the total isocyanate present for reaction with the PTMG.

ILLUSTRATIVE EMBODIMENTS

This following examples are provided to illustrate the invention but are not intended to limit the scope thereof. All parts and percentages are given by weight unless otherwise indicated. The physical properties of the microcellular polymers where reported are observed according to the following procedures; density-DIN 53420; hardness (Shore A)-DIN 53505; abrasion resistance-DIN 535316; tensile strength and elongation-DIN 53504; tear strength-DIN 53507 and bending resistance-DIN 53543.

A number of isocyanate-terminated prepolymers are prepared for use in manufacturing polyurethane polymers by the process of this invention. The prepolymers are obtained by reacting a polyisocyanate containing 4,4'-methylene diphenylisocyanate(4,4'-MDI) with a poly(oxytetramethylene) glycol(PTMG) according to the following general procedure; the quantities and types of isocyanate and glycol used are given in Table I.

The following examples illustrate the use of the prepolymers to prepare polyurethane polymers. The additional reactants and components present when preparing the polyurethane polymers are identified as follows:
Polyol-1: a poly(oxypropylene-oxyethylene) diol, equivalent weight 2000, primary hydroxyl content 92 percent
Polyol-2: a poly(oxypropylene-oxyethylene) glycerine-initiated polyol, equivalent weight 2000, primary hydroxyl content 79 percent.
TEDA: triethylenediamine
DBTDL: dibutyltin dilaurate
Refrigerant-11: trichlorofluoromethane.

POLYMER EXAMPLES 1 to 13

Molded microcellular polyurethane polymers are prepared according to the following formulation given in Table 11, employing a mold with dimensions of $20 \times 20 \times 1.0$ cm thermostated to $45°$ C.; demold time 4 minutes. Physical properties of the resulting polymers are also reported in Table II. Examples 1 to 6 illustrate the variance of physical properties with isocyanate reaction index and Examples 7 to 11 the variance of such properties with molded density. Example 13 illustrates preparation of a polymer using only water as the blowing means.

TABLE II

| Formulation (parts) | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| Polyol-1 | 59.2 | 59.2 | 59.2 | 58.5 | 58.5 | 58.5 | 59.9 | 59.9 | 59.9 | 59.9 | 59.9 | 58.3 | 62.3 |
| Polyol-2 | 25.4 | 25.4 | 25.4 | 25.1 | 25.1 | 25.1 | 25.7 | 25.7 | 25.7 | 25.7 | 25.7 | 24.7 | 26.8 |
| 1,4-BDO | 8.6 | 8.6 | 8.6 | 9.6 | 9.6 | 9.6 | 7.7 | 7.7 | 7.7 | 7.7 | 7.7 | 9.7 | 9.3 |
| TEDA | 0.6 | 0.6 | 0.6 | 0.6 | 0.6 | 0.6 | 0.5 | 0.5 | 0.5 | 0.5 | 0.5 | 0.6 | 0.67 |
| DBTDL | 0.02 | 0.02 | 0.02 | 0.02 | 0.02 | 0.02 | 0.016 | 0.016 | 0.016 | 0.016 | 0.016 | 0.02 | 0.02 |
| Water | 0.18 | 0.18 | 0.18 | 0.18 | 0.18 | 0.18 | 0.18 | 0.18 | 0.18 | 0.18 | 0.18 | 0.17 | 0.46 |
| R-11 | 6.0 | 6.0 | 6.0 | 6.0 | 6.0 | 6.0 | 6.0 | 6.0 | 6.0 | 6.0 | 6.0 | 6.0 | / |
| Prepolymer-2 | 62 | 63 | 64 | 67 | 69 | 70 | 63 | 63 | 63 | 63 | 63 | 69 | 73 |
| NCO/OH Index | 0.98 | 1.0 | 1.02 | 0.98 | 1.0 | 1.02 | 1.0 | 1.0 | 1.0 | 1.0 | 1.0 | 1.00 | 0.96 |
| Density (Kg/m$^3$) | 580 | 580 | 585 | 580 | 580 | 570 | 490 | 550 | 590 | 640 | 685 | 640 | 630 |
| Hardness (Shore A) | 43 | 44 | 45 | 47 | 49 | 48 | 38 | 43 | 45 | 48 | 52 | 63 | 56 |

TABLE II-continued

| Formulation (parts) | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| Abrasion Loss (mg) | 240 | 210 | 191 | 200 | 190 | 170 | 185 | 177 | 149 | 153 | 144 | 150 | 215 |
| Tensile Strength (N/mm$^2$) | 2.5 | 3.4 | 2.6 | 2.7 | 3.5 | 3.2 | 3.2 | 3.4 | 3.8 | 4.5 | 5.4 | 5.4 | 4.8 |
| Elongation (%) | 630 | 650 | 610 | 475 | 630 | 560 | 630 | 665 | 675 | 715 | 810 | 550 | 590 |

POLYMER EXAMPLE 14

This example illustrates a microcellular polymer prepared according to the process of the invention and its resulting physical properties in comparison to a microcellular polymer obtained using a typical commercially available "hard-segment" isocyanate-terminated prepolymer, Comparative prepolymer A, reacted with a polyether polyol. The "hard-segment" isocyanate-terminated prepolymer, Isonate TM PM 180 sold by The Dow Chemical Company has an isocyanate content of 23.3 weight percent and is the product of 4,4'-methylene diphenylisocyanate with a mixture of tripropylene and dipropylene glycol.

The formulation used to prepare the polymer and some of the physical properties of the resulting polymer are presented in Table III. As can be observed, the polymers produced by the process of this invention having a similar molded density and hardness, generally display enhanced physical properties including abrasion resistance, tensile strength and low temperature flexibility.

TABLE III

| Formulation | Ex. 14 | Comp. Ex. A* |
|---|---|---|
| NCO/OH Index | 1.0 | 1.0 |
| Prepolymer-1 | 69 | / |
| Comparative Prepolymer-A* | / | 42 |
| Polyol-1 | 58.3 | 70.5 |
| Polyol-2 | 24.7 | 15.0 |
| 1,4-BDO | 9.7 | 7.70 |
| TEDA | 0.60 | 0.54 |
| DBTDL | 0.02 | 0.02 |
| Water | 0.17 | 0.17 |
| R-11 | 6.0 | 6.0 |
| Density (Kg/m$^3$) | 600 | 600 |
| Hardness (Shore A) | 56 | 55 |
| Abrasion Loss (mg) | 170 | 270 |
| Tensile Strength (N/mm$^2$) | 4.9 | 4.4 |
| Bending Resistance; No. of Kcycles to fracture | | |
| i) −20° C. | >>100 | >50 |
| ii) −50° C. | 40 | no fracture |

*Not an example of this invention

POLYMER EXAMPLES 15 TO 24

The following examples illustrate the preparation of polyurethane polymers according to the process of this invention by reacting other PTMG-based prepolymers or combinations with an active hydrogen-containing composition comprising polyether polyol and chain extending agent, in the presence of water as the sole blowing means. Formulation details and some of the physical properties of the resulting polymers are given in Table IV.

Polymers obtained by reacting a polyisocyanate composition containing a combination of PTMG-based isocyanate-terminated prepolymers exhibit especially interesting physical properties including abrasion performance and elongation.

TABLE IV

| Formulation (parts) | Ex. 15 | Ex. 16 | Ex. 17 | Ex. 18 | Ex. 19 | Ex. 20 | Ex. 21 |
|---|---|---|---|---|---|---|---|
| Polyol-1 | 57.3 | 57.3 | 57.3 | 57.3 | 57.3 | 57.3 | 57.3 |
| Polyol-2 | 30.8 | 30.8 | 30.8 | 30.8 | 30.8 | 30.8 | 30.8 |
| 1,4-BDO | 10.2 | 10.2 | 10.2 | 10.2 | 10.2 | 10.2 | 10.2 |
| TEDA | 0.66 | 0.66 | 0.66 | 0.66 | 0.66 | 0.66 | 0.66 |
| DBTDL | 0.02 | 0.02 | 0.02 | 0.02 | 0.02 | 0.02 | 0.02 |
| Surfactant | 0.5 | 0.5 | 0.5 | 0.5 | 0.5 | 0.5 | 0.5 |
| Water | 0.5 | 0.5 | 0.5 | 0.5 | 0.5 | 0.5 | 0.5 |
| Prepolymer-2 | 80 | / | / | / | 77 | 75 | 72 |
| Prepolymer-3 | / | 67 | / | / | / | / | / |
| Prepolymer-4 | / | / | 58 | 46① | / | / | / |
| Prepolymer-5 | / | / | / | / | 3 | 5 | 8 |
| Comparative Prepolymer A* | / | / | / | 12 | / | / | / |
| NCO/OH Index | 0.98 | 0.98 | 0.98 | 0.98 | 0.98 | 0.98 | 0.98 |
| Density (Kg/m$^3$) | 600 | 600 | 600 | 600 | 600 | 600 | 600 |
| Hardness (Shore A) | 55 | 56 | 57 | 58 | 53 | 54 | 54 |
| Abrasion Loss (mg) | 220 | 330 | 330 | 340 | 240 | 190 | 200 |
| Tensile Strength (N/mm$^2$) | 5.7 | 5.1 | 4.7 | 5.2 | 5.6 | 5.8 | 5.4 |
| Elongation (%) | 550 | 470 | 480 | 470 | 480 | 500 | 520 |

*Comparative prepolymer A same as described in Polymer Example 14 description
① Prepolymer-4 constitutes 79 weight percent of the total polyisocyanate composition.

What is claimed is:

1. A process for preparing a polyurethane polymer by intimately mixing under reaction conditions an organic polyisocyanate composition with an active hydrogen-containing composition in the presence of a blowing agent comprising water characterized in that a) the polyisocyanate composition has an isocyanate content of from about 14 to about 28 weight percent and consists of the reaction product of a poly-(oxytetramethylene) glycol which has an average hydroxyl equivalent weight of from about 250 to about 1500 with a molar excess of a polyisocyanate containing from at least 70 weight percent, 4,4'-methylene diphenylisocyanate and up to about 30 weight percent of a polyisocyanate selected from the group consisting of 2,4'-methylene diphenylisocyanate, 2,4- and 2,6-toluene diisocyanate, cyclohexane diisocyanate, carbodiimide-modified adducts thereof and polymethylenepolyphenylpolyisocyanates;

b) the active hydrogen-containing composition comprises
  i) from about 70 to about 99 parts by weight of a polyether polyol or mixtures thereof which has an average hydroxyl equivalent weight of from about 1000 to about 3000, an average molar functionality of from about 1.6 to about 3.0 and a primary hydroxyl content of at least 50 percent of its total hydroxyl content; and
  ii) in from about 1 to about 30 parts by weight of a chain-extending agent which has an equivalent weight of less than or equal to about 150; and
c) the blowing agent is present in an amount sufficient to provide the resulting polymer with an overall density of from about 100 to about 1000 kg/m$^3$, and wherein the polyisocyanate composition (a) is present in an amount so as to provide from about 0.85 to about 1.3 isocyanate groups per active hydrogen atom of the composition (b) and water present.

2. The process of claim 1 wherein the polyisocyanate composition is present in an amount to provide from about 0.94 to about 1.05 isocyanate groups per active hydrogen atom of the composition and water present.

3. The process of claim 2 wherein the polyisocyanate composition has an isocyanate content of from about 14 to about 23 weight percent.

4. The process of claim 3 wherein the polyisocyanate composition contains the reaction product of a poly(oxytetramethylene) glycol which has an average hydroxyl equivalent weight of from about 500 to about 1200.

5. The process of claim 4 wherein the poly(oxytetramethylene) glycol has an average hydroxyl equivalent weight of from about 750 to about 1200.

6. The process of claim 1 wherein the polyether polyol component of the active hydrogen-containing composition is present in an amount of from about 75 to about 95 parts by weight and has a primary hydroxyl content of at least 75 percent.

7. The process of claim 6 wherein the chain-extending agent is present in an amount of from about 5 to about 15 parts by weight.

8. The process of claim 1 wherein the blowing agent is present in an amount to provide the resulting polymer with an overall density of from about 400 to about 900 kg/M$^3$.

9. The process of claim 8 wherein
a) the polyisocyanate composition has an isocyanate content of from about 14 to about 23 weight percent and consists of the reaction product of a poly(oxytetramethylene) glycol which has an average hydroxyl equivalent weight of from about 750 to about 1200 with a molar excess of a polyisocyanate containing from at least 85 weight percent, 4,4'-methylene diphenylisocyanate and up to about 15 weight percent of a polyisocyanate selected from the group consisting of 2,4'-methylene diphenylisocyanate, carbodiimide-modified adducts thereof and polymethylenepolyphenyl-polyisocyanates; and
b) the active hydrogen-containing composition comprises
  i) from about 75 to about 90 parts by weight of a polyether polyol or mixtures thereof which has an average hydroxyl equivalent weight of from about 1000 to about 3000, an average molar functionality of from about 1.9 to about 3.0 and a primary hydroxyl content of at least 75 percent of its total hydroxyl content; and
  ii) from about 5 to 15 parts by weight of a chain-extending agent,
wherein (a) is present in an amount to provide from about 0.96 to about 1.04 isocyanate groups per active hydrogen atom of the composition and water.

10. The process of claim 9 wherein the blowing agent consists essentially of water.

11. A microcellular polyurethane polymer prepared by the process of claim 1.

12. A microcellular polyurethane polymer prepared by the process of claim 9.

13. A microcellular polyurethane polymer prepared by the process of claim 10.

14. The process of claim 10 wherein the water is present in from about 0.05 to about 2 weight percent based on total weight of the active hydrogen-containing composition.

15. The process of claim 14 wherein the water is present in from about 0.1 to about 1 weight percent.

16. The process of claim 7 wherein the chain-extending agent is 1,4-butanediol, 1,6-hexanediol, neopentyl glycol, 1,4-cyclohexane diol, ethylene glycol, bis(hydroxyethoxy)benzene, ethoxylated hydroquinone, glycerine, diethylene glycol, or mixtures thereof.

17. The process of claim 4 where:
a) the polyisocyanate composition has an isocyanate content of from about 15 to about 21 weight percent and consists of the reaction product of a poly(oxytetramethylene) glycol which has an average hydroxyl equivalent weight of from about 750 to about 1200 with a molar excess of a polyisocyanate containing from at least 85 weight percent, 4,4'-methylene diphenylisocyanate and up to about 15 weight percent of a polyisocyanate selected from the group consisting of 2,4'-methylene diphenylisocyanate, carbodiimide-modified adducts thereof, and polymethylenepolyphenylpolyisocyanates;
b) the active hydrogen-containing composition comprises
  i) from about 75 to about 90 parts by weight of a polyether polyol or mixtures thereof which has an average hydroxyl equivalent weight of from about 1500 to about 2500, an average molar functionality of from about 1.9 to about 3.0, and a primary hydroxyl content of at least 75 percent of its total hydroxyl content,
  ii) as chain-extending agent, from about 5 to about 15 parts by weight of 1,4-butanediol, 1,6-hexanediol, neopentyl glycol, 1,4-cyclohexane diol, ethylene glycol, bis(hydroxyethoxy)benzene, ethoxylated hydroquinone, glycerine, diethylene glycol, or mixtures thereof; and
c) water is present in from about 0.1 to about 1 weight percent based on total weight of the active hydrogen-containing composition,
wherein the polyisocyanate composition is present in an amount to provide from about 0.96 to about 1.02 isocyanate groups per active hydrogen atom of the composition (b) and water.

* * * * *